(12) United States Patent
Kempisty

(10) Patent No.: US 7,109,974 B2
(45) Date of Patent: Sep. 19, 2006

(54) REMOTE CONTROL SYSTEM INCLUDING AN ON-SCREEN DISPLAY (OSD)

(75) Inventor: Mark S. Kempisty, Richboro, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 358 days.

(21) Appl. No.: 10/090,877

(22) Filed: Mar. 5, 2002

(65) Prior Publication Data

US 2003/0169234 A1    Sep. 11, 2003

(51) Int. Cl.
  *G09G 5/00* (2006.01)
(52) U.S. Cl. ..................... 345/173; 348/734
(58) Field of Classification Search ............... 345/156, 345/168, 169, 173, 1.1, 1.2, 21, 2.2, 2.3, 345/2.1; 348/734, 569; 725/141, 151, 131, 725/133
  See application file for complete search history.

(56) References Cited

U.S. PATENT DOCUMENTS

| | | | |
|---|---|---|---|
| 4,712,105 A | 12/1987 | Kohler | |
| 5,189,517 A | 2/1993 | Ohara | |
| 5,307,055 A | 4/1994 | Baskin et al. | |
| 5,410,326 A | 4/1995 | Goldstein | |
| 5,450,079 A | 9/1995 | Dunaway | |
| 5,506,626 A | 4/1996 | Yagi et al. | |
| 5,969,770 A * | 10/1999 | Horton | 348/569 |
| 6,104,334 A | 8/2000 | Allport | |
| 6,130,726 A | 10/2000 | Darbee et al. | |
| 6,532,592 B1 * | 3/2003 | Shintani et al. | 725/141 |
| 2003/0159146 A1 * | 8/2003 | Kim | 725/46 |

* cited by examiner

*Primary Examiner*—Kent Chang
(74) *Attorney, Agent, or Firm*—RatnerPrestia

(57) ABSTRACT

A remote control system is provided for producing a secondary on screen display (OSD). The secondary OSD is produced by a display device of a remote control unit. The remote control unit includes a remote receiver responsive to the OSD function parameters of an operably linked electronic device. A data processor generates a secondary on-screen display in response to the received OSD function parameters. A display operably linked to the data processor for displaying a menu corresponding to the received OSD parameters. A transmitter for providing a control parameter corresponding to a menu selection from the remote control unit to the electronic device.

17 Claims, 3 Drawing Sheets

REMOTE CONTROL SYSTEM INCLUDING AN ON-SCREEN DISPLAY (OSD)

BACKGROUND OF THE INVENTION

The present invention relates to a remote control system, and, more particularly, to a remote control unit including an on-screen display (OSD) for providing an auxiliary OSD for a video signal processor.

Remote control devices for remotely operating electronic devices are well known. Operators of electronic devices utilize hand held remote control units to operate the electronic devices and/or adjust their functionality from a remote location. For example, consumer electronic devices such as televisions, video recorders, audio systems, digital versatile disc (DVD) players and the like are typically controlled via hand held remote control units. As remote control devices have become numerous and commonplace in day-today use, operators of consumer electronic devices have become increasingly dependent upon these devices to properly operate consumer electronic equipment.

The functionality of consumer electronic devices has become increasingly complex in operation as devices include more features for processing digital television broadcasts and advanced audio features (i.e., Surround Sound, closed captioning, picture-in-picture (PIP), THX®, etc). As device complexity increases, the corresponding hand held remote control unit likewise increases in complexity.

Often times remote control operation initiates the display of a menu on a responsive video display device. These "on-screen menus", enable an operator to select from a plurality of further functions which would be impracticable to include as separate buttons on the remote control unit. For example, an operator may select an "audio menu" button on a remote control unit, in turn a display device responsive to the remote control produces an audio menu on the display of the device, such as 1. MONO 2. STEREO 3. SURROUND 4. SAP. In this way, by selecting the corresponding number key on the remote control unit, and transmitting a corresponding remote control signal, the operator selects the desired menu function of the video display device.

Yet, operators with vision problems, such as the elderly may have difficulty reading/seeing on-screen menus from a remote location. Additionally, the on-screen menu either fully or partially obstructs the display of video content on the display device for the duration of the on-screen menu utilization.

SUMMARY OF THE INVENTION

A remote control system in accordance with the present invention operates to provide a secondary on screen display (OSD) on a display of a remote control unit to enable unobstructed view of a primary display and/or to allow the visually impaired to operate an OSD menu.

The present invention provides a remote control system for producing a secondary on screen display (OSD). The secondary OSD is produced by a display local to the remote control unit. The remote control unit includes a remote receiver responsive to the OSD function parameters of an operably linked electronic device. A data processor generates a secondary on-screen display in response to the received OSD function parameters. The local display is operably linked to the data processor for displaying a menu corresponding to the received OSD parameters. A transmitter provides a control parameter corresponding to a menu selection from the remote control unit to the electronic device for accessing the menu feature.

The present invention further provides a method of providing a secondary on screen display (OSD). The secondary OSD is produced by the electronic device local to a remote control unit. A remote control unit receives OSD function parameters from an operably linked electronic device and displays the secondary OSD on the local display device.

Still further, the present invention provides a remote control system for producing a channel selection guide or closed captioning information on a secondary display of a remote control unit. The remote control unit includes a remote receiver responsive to content data of an operably linked electronic device. A data processor generates a secondary display in response to the received content data. A transmitter is provided for transmitting a channel selection corresponding to a channel guide menu listing from the remote control unit to the electronic device for accessing the selected channel.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
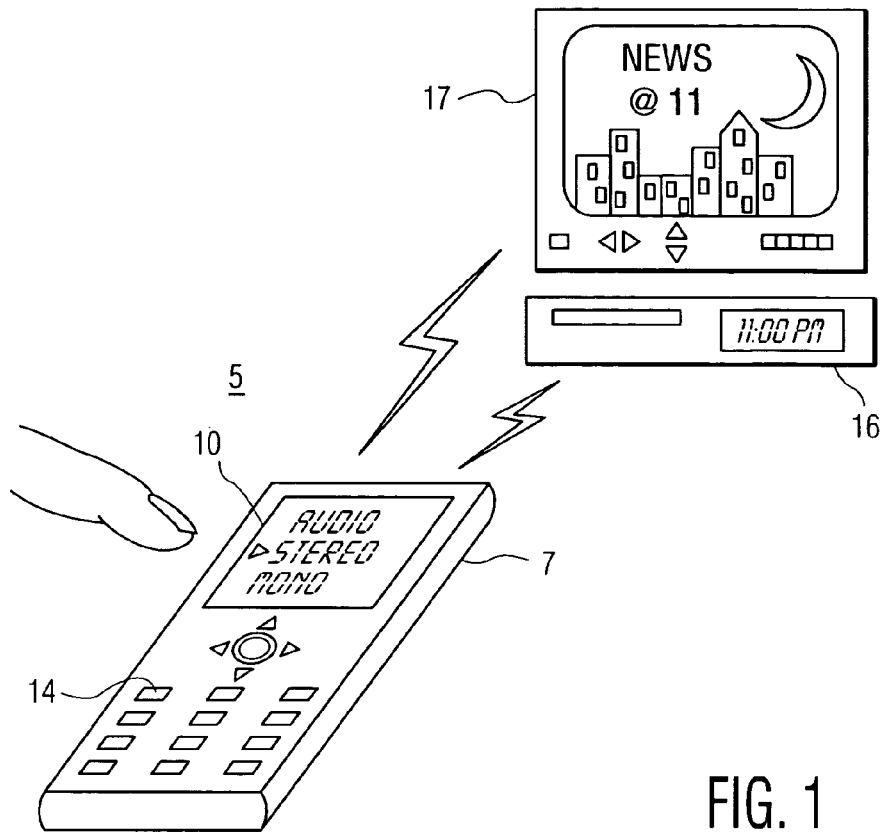
FIG. 1 is a perspective view a remote control system for providing a secondary OSD display in accordance with an exemplary embodiment of the invention.

Certain terminology used in the following description is for convenience only and is not limiting. The term "electronic device" is defined as referring to any electronic device which is capable of receiving a signal originated from an external source for controlling the operation of the device via a direct input or wireless input. The term "secondary display" is defined as referring to a display produced on a display device that is local to a remote control unit, the "primary display" being produced on the display device of an operably linked electronic device. In the drawings, the same reference numerals are used for designating the same elements throughout the several figures.

The present invention provides a remote control system for producing a secondary on-screen display (OSD). The present invention produces an (OSD) image pattern to a display device of a remote control unit as a substitute and/or alternative to the primary OSD display of an electronic device. In this way, the present invention allows the user to view the primary display unobstructed while the television receiver is producing the OSD image, for example, during menu selection as well as providing a portable menu/channel guide, sports/financial data, or closed captioning (C.C.) display. Because the content displayed on the remote control device is derived from the television receiver or other electronic device, a single remote control unit may be used to control multiple electronic devices and to display information or control menus provided by these devices.

A remote control system in accordance with an exemplary embodiment of the invention produces a secondary on screen display (OSD) on a local display device. The remote control unit includes a remote receiver responsive to the OSD function parameters of an operably linked electronic device. A data processor generates the OSD in response to the received OSD function parameters. The local display device may be operably linked to the data processor for displaying a menu at the remote control unit corresponding to the received OSD parameters. A transmitter may provide a control parameter corresponding to a menu selection from the remote control unit to the electronic device.

I. System Components

Referring now more specifically to the drawings, FIG. 1 shows a perspective view of a remote control system 5 in accordance with the present invention. In this exemplary embodiment, the remote control system 5 includes a remote control unit 7, having a display 10 and an operator interface 14 for receiving data selections of an operator. The remote control unit 7 exchanges data (e.g., menu data, channel guide data, closed captioning data, sport/financial data, remote control data, etc.) with an electronic device for effecting remote operation of electronic devices or displaying information from the devices, generally designated 16, responsive to the signals of the remote control 7.

In the exemplary embodiment, data may be exchanged between remote control unit 7 and electronic devices 16 via an infrared interface (not shown). While the exemplary embodiment is described with reference to electronic devices which employ infrared signals for remote control operation, those skilled in the art will recognize that the present invention is applicable to a variety of wireless transmission technologies such as radio frequency (RF) technology, including such standards as Blue Tooth®.

In the exemplary embodiment, the display 10 of remote control unit 7 is provided for producing a secondary display such as an OSD menu, channel guide, closed captioning data or sport/financial data. The remote control unit 7 includes a remote receiver responsive to the OSD function parameters of an operably linked electronic device 16. The OSD function parameters and content data signals (e.g., menu data, channel guide information, closed captioning and sport/financial data content) generated by the electronic device 16 are transmitted to the remote control unit 7. When receiving menu data, an operator can select menu options of the secondary OSD display for actuating the corresponding menu selection. In the exemplary embodiment, the selections of the secondary display are provided from remote control unit 7 to the electronic devices 16 as remote control data signals.

As shown in the exemplary secondary displays of FIG. 2, the channel guide data enables an operator to select a scheduled program from the channel guide list by scrolling through the list using pointer 11. In the exemplary embodiment, the channel guide data may include numerical indicia 13 such as that utilized by the VCR+® system. The a channel guide data is provided to the remote control unit 7 as OSD parameters for generating a secondary display. In an alternative embodiment, the secondary display may be generated by sub-sampling the primary OSD display and transmitting to the remote control unit 7 from the electronic device 16 as sub-sampled pixel values. Similarly, the closed captioning data transmitted with the video signal may be provided for use by elderly, deaf and/or visually impaired operators on the screen 10 of the remote control unit 7. Operators may control the rate of scrolling to achieve a comfortable reading speed.

In the exemplary embodiment, sport/financial data can be provided to the remote control unit 7 as OSD parameters for receiving up to the minute sports scores and/or financial market updates and the like. Sport/financial data may be provided to the electronic device 16 in the usual manner via an existing content channel, or the electronic device 16 may include a proprietary receiver for receiving the sport/financial data. The sports data may include wagering data, such as live Keno broadcast data and/or sport wagering information commonly broadcast to electronic devices 16 of a casino or betting parlor. For example, an operator wagering a certain Keno combination can monitor the Keno simulcast game via the secondary display of the remote control unit 7. In an alternative embodiment, an operator can monitor sporting event wagering data in lawful jurisdictions such as Las Vegas, Nev. Further, a betting parlor may incorporate the primary OSD menu of an electronic device 16 for receiving wagering data from an operator of the remote control unit 7 and/or electronic device 16. Thus, an operator may have the option of wagering on a scheduled sporting event based on data provided to the hotel to secure a hotel room (i.e., credit card). As above, in the exemplary embodiment, the secondary display is generated by transmitted OSD parameters of the electronic device 16, however those skilled in the art will recognize that the secondary display may be generated from a sub-sampling of the primary display or similar transmission.

In this way, a visually impaired or elderly operator can operate an OSD menu of an electronic device 16 by way of the secondary OSD display of remote control unit 7. The operator may also view closed captioning information, select a channel from a channel guide menu, or view sports/financial data via the remote control unit 7 as described above.

II. Primary Display Device.

Figure 3:
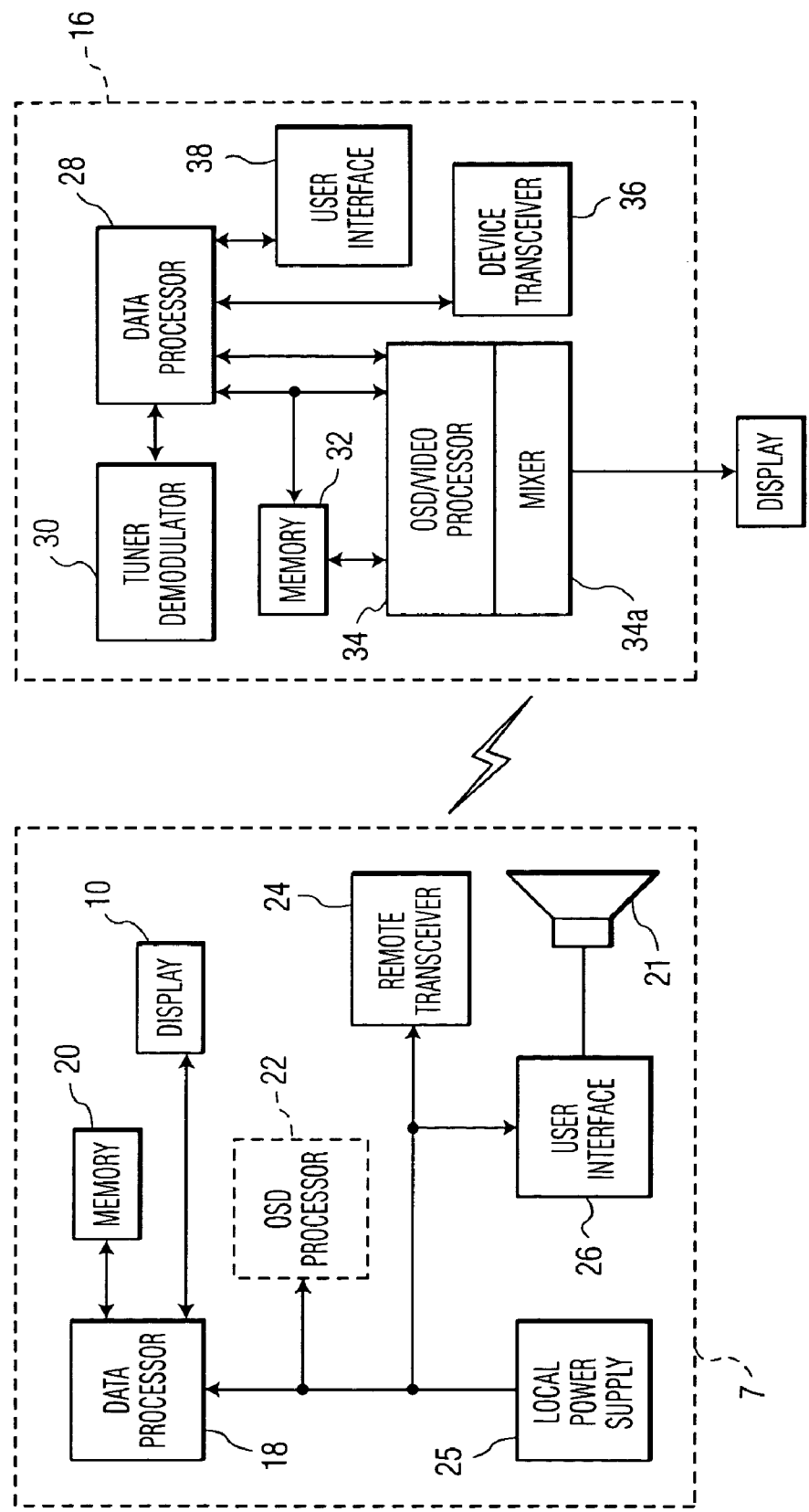
FIG. 3 is a high level block diagram of the exemplary remote control unit and electronic device of the remote control system of FIG. 1.

Referring now more specifically to the drawings, FIG. 3 shows a high level block diagram of a basic digital television IRD (Integrated Receiver and Decoder) 16. In the materials that follow, the IRD 16 is used as an exemplary electronic device. It is contemplated, however, that other consumer devices such as video tape recorders, digital versatile disk (DVD) players, standard definition analog television receivers etc. may be used as the electronic device. The exemplary electronic device 16 employs a primary display 17 for providing visual data of the IRD as known to those skilled in the art. The IRD includes a tuner and demodulator module 30, a main data processor 28, user interface 38, OSD and video processor 34, mixer 34a and memory 32. While the exemplary electronic device 16 is described in terms of an IRD, those skilled in the art will recognize that the present invention is applicable to any of a number of different electronic devices 16.

Digital audio-visual data flow is provided from tuner and demodulator module 30, to OSD and video processor module 34. The main data processor 28 communicates control information with modules 30, 34 and 36, as indicated via the solid lines.

The exemplary digital television receiver may, for example, process an audio/video bitstream, encoded, for example, according to the standard specified by the Advanced Television Systems Committee (ATSC). The exemplary system decodes the digital bitstream to present the decoded signals to a corresponding audio and video output ports of the receiver. Typically, the IRD of electronic device 16 receives and demodulates digital television signals to recover the bitstreams. The IRD then performs real time audio and video decompression of various data streams communicated to the device to recover the audio and video data. An exemplary ATSC decoder is described in U.S. Pat. No. 6,175,592 entitled FREQUENCY DOMAIN FILTERING FOR DOWN CONVERSION OF A DCT ENCODED PICTURE.

The IRD 16 also includes a conventional analog television decoder, for example, an NTSC decoder, which demodulates and decodes analog television signals to provide analog audio and video output signals. As known to those skilled in the art, an analog NTSC signal may include digital signals representing text to be displayed. For example, NTSC signals may include digital closed caption text encoded in the vertical blanking interval. Methods for extracting, formatting and displaying closed caption text are described in U.S. Pat. No. 5,506,626 entitled CLOSED CAPTION DECODER HAVING ROBUST SYNCHRONIZATION FEATURES.

The tuner and demodulator module 30 receive and demodulate the television signals that include the transmitted digital television bit streams or analog television signals. If a digital television signal is being received, the tuner and demodulator 30 may also separate the transport packets relating to a desired television program and decode the transport packets to provide either program elementary stream (PES) packets or fully decoded audio and video bit-streams to the OSD and video processor 34. The processor 34 decodes the bit streams to provide audio and video signals. Alternatively, the bit stream may be decoded by a separate MPEG decoder (not shown). If the tuner and demodulator 30 is processing an analog television signal, it separates the audio and video components and provides the video components to the OSD and video processor 34.

In the exemplary embodiment of the invention, data processor 28 may also perform a plurality of control functions in accordance with control parameters of the control stream. Specifically, the data processor 28 may provide control data to the video processor/OSD 34, manage access to memory 32 and control the display of decoded images of the data stream. The data processor 28 may, for example, determine, responsive to a viewer selection, which television program is to be received, decoded and displayed on the primary display of electronic device 16. Using this information the processor 28 may control the tuner and demodulator to tune to the channel that contains the desired program and separate the transport packets for this program from the decoded packet data for that channel. The data processor 28 may also control the OSD and video processor 34, for example, to display menus and receive control values that, for example, adjust the brightness and color balance of the displayed image and to display predetermined text at the primary display.

User interface 38 of the exemplary embodiment includes an infrared input port for receiving data from the remote control device 7 and circuitry for receiving manual input of data from a control panel of the audio-visual device. In response to the viewer using the controls on the control panel, this circuitry may, for example, send a message to the main data processor 28, signaling it to display a control menu on the display device 17 and then interpret further commands entered via the control panel as being related to the displayed menu.

The memory 32 is typically a random access memory which may store the OSD bit map, and, for digital programs, the compressed data and one or more decoded images. The memory 32 may be partitioned into a plurality of buffers. A bit-stream buffer that stores compressed data, an OSD buffer that stores the OSD bit map (e.g., menu functions, closed caption data and channel logos transmitted from audio visual devices and cable systems), and frame buffers that store frames of decoded video images. In this way, video processor 34 decodes the compressed data in memory 32 and reconstructs the image data for storage in the appropriate buffer. Where the received signal is a digital television signal, the transmitted, compressed data may represent only information that has changed relative to a previously transmitted image. The resulting image is reconstructed by decompressing this residual data and adding it to a stored reference image. Thus, the memory 32 typically holds three images, two reference images and an image that is currently being decoded. One of these images is also being displayed at any given time.

Typically, the OSD information is displayed by overlaying the OSD bit-map onto the image that is being displayed on the primary display 17 of electronic device 16. Mixer 34*a* serves to selectively blend image data with OSD pixel data. The mixer 34*a* displays each pixel at a location. The displayed pixel may include, for example, an OSD pixel, a pixel of an image, or a combination thereof. The output signal of mixer 34*a* is a video signal that is provided to the display device 17. The signals provided may be displayed either on a conventional television monitor having, for example, a 4 by 3 aspect ratio or they may be displayed on a so-called "digital ready" monitor having a 16 by 9 aspect ratio.

OSD data may be locally generated or it may be provided in the received bit stream. The OSD pixel data may then be superimposed on the decoded image for such data as, subtitles in letterbox displays, EPG's and closed captioning. OSD menu data typically is substituted for the decoded image and in this way obstructs regular viewing when in use. Otherwise, mixer 34*a* selectively blends or multiplexes the decoded image pixels with the OSD pixels or a combination thereof. An OSD pixel which is multiplexed with an image pixel completely replaces the image pixel in the video display. A blended OSD pixel, however, does not replace the pixel but may, for example, selectively darken the pixel so that the OSD display appears to be a transparent overlay covering a portion of the video image.

In the exemplary embodiment the OSD bitstreams including menu data may be displayed on the display device 17 or may be provided to the remote control unit 7 via a device transceiver 36. In the present invention, mixer 34*a* of electronic device 16 may be disabled to utilize only the display 10 of an operably linked remote control unit 7 to display the OSD data, or the secondary display may be redundant in function to that of the primary display of electronic device 16.

The device transceiver 36 may be a combination transmitter and receiver (transceiver) as shown for communicating directly with the remote control unit 7 to exchange, for example, menu data, channel guide data, closed captioning data, sport/financial data and for receiving remote control data. Although, those skilled in the art will recognize that separate receiver and transmitter hardware may be utilized. In the exemplary embodiment, the transceiver 36 of electronic device 16 may include an infrared transmission source and an infrared receiver, however the present invention is not limited to any specific carrier type/frequency. For example, in an alternative embodiment, an RF signal may be utilized such that the remote control unit 7 may receive an omni-directional signal. In this embodiment and in any of the other embodiments, the signal transmitted from the electronic device 16 to the remote control unit 7, may be on a different frequency or by a different method, for example, to reduce interference in accordance with federal communication commission (F.C.C.) regulations.

Figure 2A:
FIGS. 2A and 2B are exemplary displays of the remote control unit showing channel guide and closed captioning information in accordance with an exemplary embodiment of the invention.

The channel guide data as shown in the exemplary secondary display of FIG. 2A is a listing of available programs and related scheduling data. The device transceiver 36 of the exemplary embodiment recovers this data from a signal provided to the electronic device 16 such as that provided by the StarSight® system or other operably linked source such as a cable head-end. The channel guide data may be provided by the device transceiver 36 to the remote control unit 7 as OSD parameters for presentation on the secondary display. Alternatively, image data from the OSD buffer in memory 32 may be provided to the remote control unit 7 depending on the relative pixel resolutions of the main display 17 and the display 10 of the remote control unit 7, it may be desirable to subsample the image data in the OSD buffer before sending the image data to the remote control unit 7.

Figure 2B:
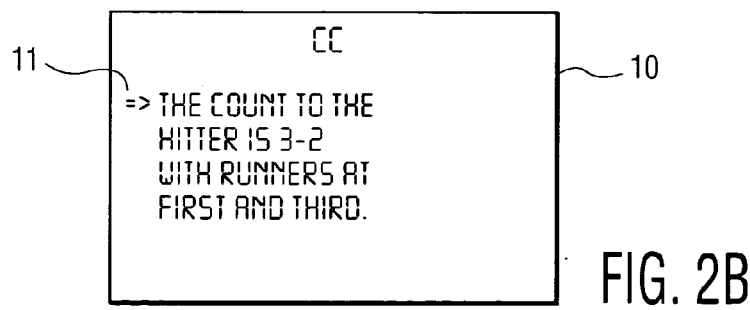

The closed captioning data as shown in the exemplary secondary display of FIG. 2B may be decoded by the electronic device 16 and provided to the remote control unit 7, or sent as data packets to the remote control unit 7 for decoding. In the exemplary embodiment, the menu data is provided to the remote control unit 7 for a predetermined "time-out" period. Where the operator does not select from an option of the menu data for a duration equal to or greater than the time-out period, the display 10 may revert to a default display of content, in the exemplary embodiment, the channel guide data may be provided as a default. Of course, the default content may be switched to the closed captioning data or sport/financial data where desired. Alternatively, the display 10 may revert to a blank display or to a menu that controls the operation of the OSD function of the device 16.

While the exemplary electronic device 16 has been described in terms of an IRD, those skilled in the art will recognize that the OSD menu data of the IRD may be provided from an auxiliary electronic device 16. Such auxiliary devices may include, for example, a video recorder or digital versatile disk (DVD) player operably linked to the IRD of the exemplary electronic device 16.

III. Secondary Display (Remote Control Unit)

In the exemplary embodiment, remote control unit 7 includes display 10, data processor 18, memory 20, speaker 21, optional OSD processor 22, remote transceiver 24, local power supply 25, and user interface 26.

In the exemplary embodiment, the remote control unit 7 is powered by a local power supply 25 such as a battery (not shown). Of course the remote control unit 7 may include a power cord adapter for operably linking the remote control unit 7 to a suitable power source. For example, the remote control unit 7 employing a power cord may be preferred for applications where the unit 7 should remain substantially stationary such as in a hotel and/or hospital room. Additionally, the remote control unit 7 may be wired directly to the electronic device 16 for directly providing remote control parameters or for receiving a power signal.

The remote control unit 7 includes control panel or "controls" 14. The controls 14 of the remote control unit 7 provide an operator means for adjusting and/or entering control parameters to provide-or adjust output signals of the electronic device 16. In an exemplary embodiment, the controls 14 are illuminated push-button switches, however those skilled in the art will recognize that the function of controls 14 can be performed by any number of switching technologies including "touch-screen" technology, via display 10. In the exemplary embodiment, the remote control unit 7 includes a "menu" button for initiating menu data transmissions from electronic device 16 to remote control unit 7. Similarly, the remote control unit 7 may include buttons for selectively accessing the closed captioning data, sport/financial data and/or channel guide data to allow a viewer to manually switch among the various displays. In the exemplary embodiment, the closed caption data and/or sports/financial data may be cached in a memory of the remote control unit, such that an operator may control the scrolling closed captioning text in accordance with his/her reading ability. In this way, the scrolling of the stored data for reproduction on display 10 may be temporarily halted or reversed via controls 14.

In an exemplary embodiment, display 10 of remote control unit 7 may be a liquid crystal display (LCD) which may have "touch-screen" functionality for making menu and/or channel guide selections. Processing circuitry (not shown) for signal conditioning and translating touch-screen commands to remote control data is known to those skilled in the art, as such the description of such has been omitted. The display 10 provides the secondary display of the system 5. In an alternative embodiment, the display 10 may further provide video images for viewing analog and/or digital video signals. In this alternative embodiment, the remote control unit 7 as provided by electronic device 16 would include the necessary video processing circuitry for presenting the video signal to the display 10 of remote control unit 7.

Additionally, the circuitry may include a local on screen display (OSD) circuit for formatting textual data received from the device 18 for display. In this embodiment, the electronic device 16 may send unformatted data to the remote control unit 7. The local OSD can be in addition to or substituted for display of the OSD of the electronic device 16.

In the exemplary embodiment of the invention, the data processor 18 of remote control unit 7 may exchange control information and data with: display 10, memory 20, optional OSD processor 22, and remote transceiver 24 as indicated by the solid lines. Specifically, the data processor 18 may receive data from the remote transceiver 24 for processing. Data processor 18 also may provide remote control parameter data to the remote transceiver 24 when a control of user interface 26 is actuated. The data processor 18 may also provide control signals to the remote transceiver 24 for decoding data packets to recover closed captioning data, in such an embodiment, the remote transceiver 24 may also include a decoder (not shown). Of course, the data processor 25 may include a "scratch-pad" memory (not shown) for caching data, performing mathematical computations, storing an instruction set, and the like.

The memory 20 of the remote control unit 7 may store or "cache" closed captioning data transmitted to the remote control unit 7 from electronic device 16 to permit the operator to scroll through the closed captioning data via display 10 at his/her own pace. In the exemplary embodiment, the memory 20 stores channel guide data transmitted from electronic device 16. In the exemplary embodiment, the channel guide data may be updated periodically by the electronic device 16, such as every 30 minutes via a refresh transmission.

Further, the memory 20 may store a secondary OSD bitmap for use in translating the OSD menu data of electronic device 16 to the format of display 10, or store the OSD bitmap of the device 18. In alternative embodiments, the optional OSD processor 22 of remote control unit 7 may be employed where OSD data is incompatible with the bitmap stored in memory 20. In this embodiment, a generic OSD display may be provided to the operator. The generic display may be one of a plurality of available generic displays loaded into the memory 20 upon manufacture. For example, the operator may provide a code or remote signal to the remote control unit 7 to select a specific one of a plurality of available generic menus to correlate with a certain electronic device manufacturer.

In the exemplary embodiment, remote transceiver 24 of remote control unit 7 may use infrared signals or RF signals, however the present invention is not limited to any specific carrier type/frequency. For example, in an alternative embodiment, an infrared transmitter section of remote transceiver 24 may provide remote control data to the electronic device 16. An RF receiver section of remote transceiver 24 may be provided for receiving menu data, channel guide data, and closed captioning data from electronic device 16. For example, as infrared transmission are directional, the RF receiver would enable the remote control unit to receive channel guide data and closed captioning data regardless of its physical orientation.

An optional speaker 21 is provided to deliver an audio output signal to an operator upon selection of a menu listing. In an alternative embodiment, the speaker 21 may be provided for presenting an audio signal to the operator in cases where the operator is hard of hearing, the speaker 21 may be an earphone mounted on a headset (not shown), such as those utilized by cellular phone users. The spoken utterances provided to the earphone of the headset may be provided to the remote control unit 7 via an audio output of the remote control unit 7 (not shown). In this way, an audible tone can be provided to an operator indicating the presence of differing menu content, such as sport/financial data, closed captioning data, or channel guide data: Alternatively, the remote control unit 7 may include text-to-speech conversion software (not shown) that translates the text of the OSD into spoken words.

IV. Secondary Display Operation

Figure 4:
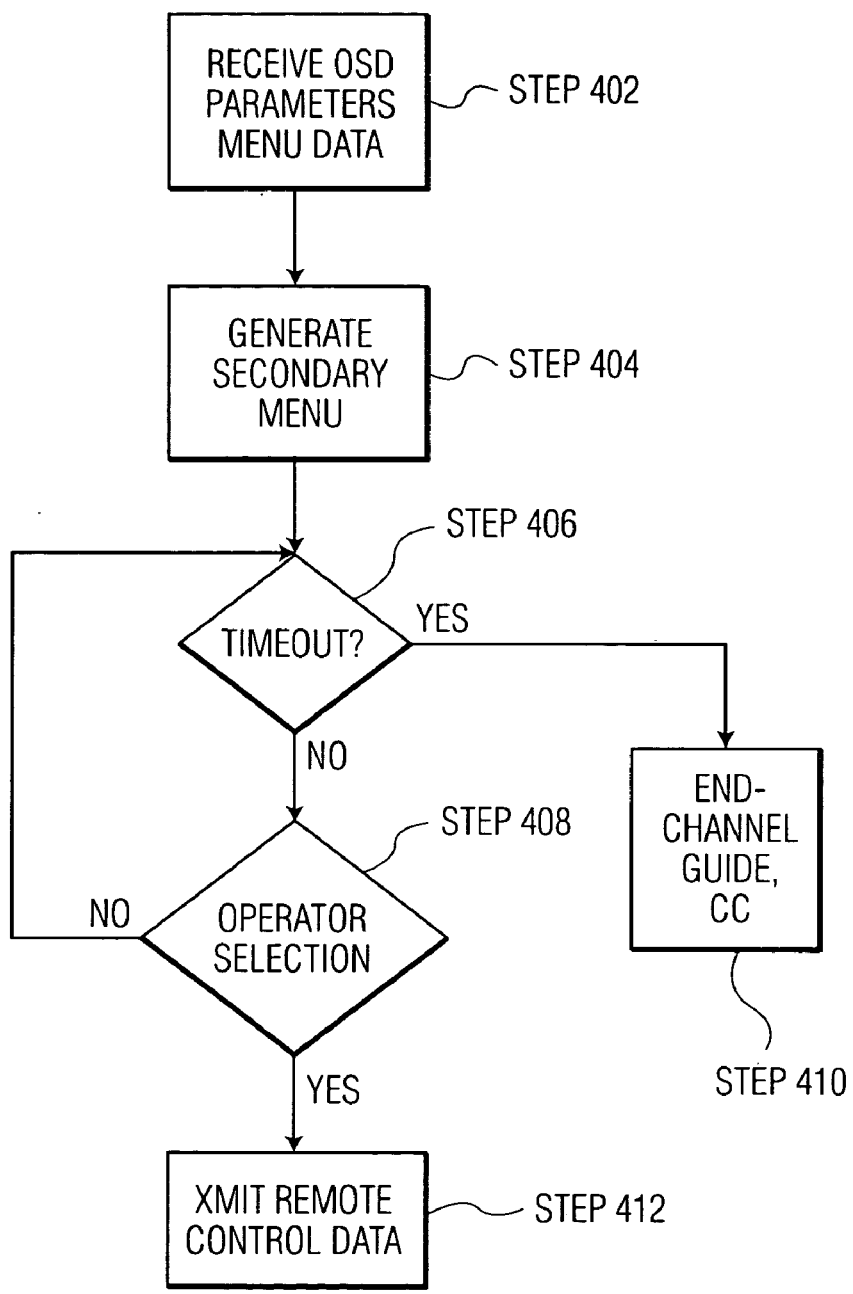
FIG. 4 is a flow chart illustrating a method of operation of the remote control unit of FIG. 1 in accordance with an exemplary embodiment of the present invention.

Referring now to FIG. 4, a flow chart illustrating an exemplary method of operation of remote control unit 7. The operation is described only in terms of menu data transmitted from the electronic device 18 to the remote control unit 7 and the transmission of a menu selection from the remote control unit 7 to the device 18. The other modes of operation, for example, displaying closed caption data or electronic program guide data will be apparent to those of skill in the art.

At step 402, OSD menu data is initiated via user interface 26 for reception at remote transceiver 24 of remote control unit 7 to provide the menu data as a secondary display. At step 404, the OSD menu data is received and translated by data processor 18 via an OSD bitmap of memory 20 to generate the secondary display menu at display 10. In alternative embodiments, the optional OSD processor 22 of remote control unit 7 may be employed where OSD menu data is incompatible with the bitmap stored in memory 20. In this embodiment, a generic menu may be provided to the operator as described above. At step 406, the remote control unit 7 awaits input data which may be entered, for example, via display 10 (i.e., touch-screen) or user interface 26, where no input data is provided for the predetermined TIMEOUT period, the process continues to step 410, where default content is displayed at display 10. If input data is provided at step 408, the operator selection is transmitted to the electronic device 16 as remote control data and the process loops to step 402.

For example, an operator reviews display 10 of remote control unit 7 to select a sporting event from the channel guide shown as default content. The operator actuates the transmission of menu data from the electronic device, for example, by depressing an appropriate key of the remote control unit 7. The electronic device 16 provides menu data to the remote control unit 7, and the channel guide is removed from the display 10. The remote control unit 7 generates a menu corresponding to the received menu data. A menu is presented to the operator via display 10 of remote control unit 7. The operator selects an option of the menu, and transmits the selection as remote control data to the electronic device 16. At this point, the electronic device 16 may provide further menu data to the electronic device, (i.e., where the operator has not selected an "exit" selection), or the menu may be replaced by the default content after a predetermined "time-out" period. As an alternative to selecting the content via a menu-driven interface, the remote control unit 7 may include one or more special keys that may be actuated to select a particular function. For example, closed caption data may be provided to the display 10 of remote control unit 7 upon depressing a "closed caption" key of the remote control unit 7, the closed caption text remains on the display 10 until the closed caption function is deselected by the operator.

Although the exemplary system is described in terms of a hardware implementation, it is contemplated that some or all of the hardware functionality may be practiced in software running on a data processor of a remote control unit. This software may be embodied in a carrier such as magnetic or optical disk or a radio frequency or audio frequency carrier wave. The software embodiment of this invention may be implemented, for example, on a standard personal digital assistant having an infrared or Blue Tooth communications port.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A remote control system for an electronic device, comprising:
    a processor in the electronic device that, in response to a signal from a remote control unit, generates image pattern information to be displayed as an on-screen display (OSD);
    a transmitter in the electronic device that transmits the image pattern information as an OSD information signal that includes menu information including a plurality of options; and
    the remote control unit, comprising:
        a receiver which receives the OSD information signal;
        a data processor which processes the OSD information signal to generate the OSD; and
        a display device operably linked to the data processor which displays the generated OSD;
        an input device for selecting one option from among the plurality of options when the menu information is displayed; and
        a transmitter for transmitting information concerning the selected option to the electronic device.

2. A remote control system according to claim 1, wherein the remote control unit further comprises a memory for storing generic OSD data, wherein the data processor generates the OSD responsive to the OSD information signal and the generic OSD data.

3. A remote control system according to claim 1, wherein the processor in the electronic device generates an OSD bitmap as the OSD Information and the remote control unit further comprises a memory for storing the OSD bitmap.

4. A remote control system according to claim 3, wherein the processor of the remote control unit down samples the OSD bitmap stored in the memory to produce a down sampled OSD for display on the display device.

5. A remote control system according to claim 1, wherein the electronic device further comprises a further display device, operably coupled to the electronic device and the processor of the electronic device is responsive to a command provided by the remote control unit to selectively suppress display of the OSD on the further display device.

6. A remote control system according to claim 1, wherein the remote control unit is a personal digital assistant.

7. A remote control system according to claim 1, wherein the OSD information also includes one or more of closed caption information and electronic program guide information.

8. A remote control method for use with an electronic device, comprising the steps of:
generating, in the electronic device, in response to a signal from a remote control unit, image pattern on-screen display (OSD) menu information including a plurality of options to be displayed as an OSD;
transmitting the generated image pattern OSD information from the electronic device;
receiving the image pattern OSD information at the remote control unit;
processing the received image pattern OSD information to generate the OSD; and
displaying the generated OSD on a display device operably linked to the remote control device;
selecting one option from among the plurality of options when the menu information is displayed; and
transmitting information concerning the selected option to the electronic device.

9. A remote control method according to claim 8, further comprising the steps of:
storing generic OSD data in the remote control unit; and
generating the OSD responsive to the received image pattern OSD information signal and the generic OSD data.

10. A remote control method according to claim 8, wherein:
the step of generating the image pattern OSD information includes the step of generating an OSD bitmap; and
the process further includes the step of storing the OSD bitmap in the remote control unit.

11. A remote control method according to claim 10, further including the step of down sampling the OSD bitmap stored in the memory to produce a down sampled OSD for display on the display device linked to the remote control unit.

12. A remote control method according to claim 8, wherein the image pattern OSD information also includes one or more of closed caption information and electronic program guide information.

13. A remote control method according to claim 8, wherein the electronic device is operably coupled to a further display device, and the method further includes the step of selectively suppressing display of the OSD on the further display device, responsive to a command from the remote control unit.

14. A computer readable carrier including computer program instructions for a remote control unit for use with an electronic device, the electronic device generating image pattern on-screen display (OSD) menu information including a plurality of options to be displayed as an OSD and transmitting the OSD information as an OSD information signal, the computer program instructions causing the remote control unit to perform a method comprising the steps of:
receiving the image pattern OSD information signal generated by the electronic device in response to a signal from the remote control unit;
processing the received image pattern OSD information signal to generate the OSD; and
displaying the generated OSD on a display device operably linked to the remote control unit;
receiving a selection of one option from among the plurality of options when the menu information is displayed; and
transmitting information concerning the selected option to the electronic device.

15. A computer readable carrier according to claim 14, wherein the computer program instructions further cause the remote control unit to perform the steps of:
storing generic OSD data in the remote control unit; and
generating the OSD responsive to the received image pattern OSD information signal and the generic OSD data.

16. A computer readable carrier according to claim 14, wherein the electronic device generates the image pattern OSD information as an OSD bitmap and the computer program instructions further cause the remote control unit to perform the step of storing the OSD bitmap.

17. A computer readable carrier according to claim 16, wherein the computer program instructions further cause the remote control unit to perform the step of down sampling the OSD bitmap stored in the memory to produce a down sampled OSD for display on the display device.

* * * * *